US008527222B1

(12) United States Patent
Chen et al.

(10) Patent No.: US 8,527,222 B1
(45) Date of Patent: Sep. 3, 2013

(54) METHOD AND APPARATUS FOR DETERMINING INSTALLATION LOCATIONS OF A PLURALITY OF FAULT INDICATORS IN A POWER NETWORK

(75) Inventors: Chao-Shun Chen, Kaohsiung (TW); Shang-Wen Luan, Kaohsiung (TW); Jen-Hao Teng, Kaohsiung (TW)

(73) Assignee: I-Shou University, Kaohsiung (TW)

( * ) Notice: Subject to any disclaimer, the term of this patent is extended or adjusted under 35 U.S.C. 154(b) by 0 days.

(21) Appl. No.: 13/529,490

(22) Filed: Jun. 21, 2012

(30) Foreign Application Priority Data

May 7, 2012 (TW) .............................. 101116238 A

(51) Int. Cl.
*G01R 31/00* (2006.01)
(52) U.S. Cl.
USPC ................... 702/58; 702/57; 702/59; 702/60; 702/61; 702/62; 716/139
(58) Field of Classification Search
USPC ..................... 716/139; 702/58–62, 182, 183, 702/185, 188, 189
See application file for complete search history.

(56) References Cited

U.S. PATENT DOCUMENTS

| | | | | |
|---|---|---|---|---|
| 7,848,897 | B2* | 12/2010 | Williams, Jr. | 702/60 |
| 7,853,417 | B2* | 12/2010 | Vaswani et al. | 702/60 |
| 2009/0119068 | A1* | 5/2009 | Banting | 702/188 |
| 2009/0240449 | A1* | 9/2009 | Gibala et al. | 702/62 |
| 2010/0268579 | A1* | 10/2010 | Momoh | 705/14.1 |
| 2011/0010118 | A1* | 1/2011 | Gaarder | 702/60 |
| 2011/0264389 | A1* | 10/2011 | Mynam et al. | 702/58 |
| 2012/0109545 | A1* | 5/2012 | Meynardi et al. | 702/58 |
| 2012/0173174 | A1* | 7/2012 | Gaarder | 702/58 |
| 2012/0179301 | A1* | 7/2012 | Aivaliotis et al. | 700/286 |
| 2012/0310555 | A1* | 12/2012 | Gaarder | 702/57 |

OTHER PUBLICATIONS

"Optimal Placement of Fault Indicators Using the Immune Algorithm", by Chin-Ying Ho, Tsung-En Lee, and Chia-Hung Lin, @IEEE 2010.*
Shang-Wen Luan et al., "Wireless Network Deployment for Intelligent Fault Indicators—A Case Study with ZigBee" TENCON 2011—2011 IEEE Region 10 Conference, pp. 1246-1250.
"Design of Wireless Network Deployment Evaluation Software for Intelligent Fault Indicators" Thirty-first Republic of China Power Engineering Seminar, Dec. 2-3, 2011, New Taipei, Taiwan, pp. 1-5.

* cited by examiner

*Primary Examiner* — Nha Nguyen
(74) *Attorney, Agent, or Firm* — Muncy, Geissler, Olds & Lowe, PLLC

(57) ABSTRACT

A method for determining installation locations of a plurality of fault indicators in a power network includes a database retrieving step, an installation location setting step, a fault analyzing step, a communication quality analyzing step, a successful probability determination step and an installation location updating step. An apparatus for determining installation locations of a plurality of fault indicators in a power network includes a database, a processor, a fault analyzing module and a communication analyzing module. The processor retrieves graphical information, communication quality information, and fault rate information of feed lines of the power network from the database. The fault analyzing module generates a plurality of fault points in different zones of the power network. The communication analyzing module measures a communication quality and calculates a communication quality information cumulative probability of each zone and then calculates a successful communication probability of each zone.

2 Claims, 3 Drawing Sheets

METHOD AND APPARATUS FOR DETERMINING INSTALLATION LOCATIONS OF A PLURALITY OF FAULT INDICATORS IN A POWER NETWORK

BACKGROUND OF THE INVENTION

1. Field of the Invention

The present invention relates to a method and an apparatus for determining installation locations of fault indicators and, more particularly, to a method and an apparatus for determining installation locations of fault indicators in a power network.

2. Description of the Related Art

A power company generally transmits power to the user ends via a power network. To smoothly transmit the power to the user ends, the power company generally installs a plurality of fault indicators at detection points of the power network to monitor the power transmission. If any nodes or feed lines in the power network malfunction and cause outage, a fault indicator near the fault location generates a fault signal and sends the fault signal to a processing center through the intermediate fault indicators between the processing center and the fault indicator sending the fault signal. The processing center judges the fault location of the power network based on the fault signal received.

Since the fault signal is transmitted through the intermediate fault indicators one by one, the communication quality between two adjacent fault indicators is one of the important factors of monitoring power transmission. Conventionally, the installation locations of the fault indicators are determined by the workers of the power company, and the fault indicators are located in places that are easy to install or observe. Namely, the communication quality between two adjacent fault indicators is not the first priority. Thus, the communication quality may be degraded due to the terrain, distance, etc. As a result, the next fault indicator may not be able to receive or detect the fault signal and, thus, determines that the previous fault indicator malfunctions and sends a wrong fault signal back to the processing center. These situations result in degradation of the power transmission monitoring. Thus, a need exists for a method and an apparatus for finding out the best installation locations of the fault indicators.

SUMMARY OF THE INVENTION

An objective of the present invention is to provide a method and an apparatus for determining installation locations of fault indicators in a power network, with the method and the apparatus providing better installation locations for the fault indicators.

The present invention fulfills the above objective by providing a method for determining installation locations of fault indicators in a power network. The method includes a database retrieving step including using a processor to retrieve a power network in a database; an installation locations setting step including using the processor to set a predetermined number of installation locations of the fault indicators, with the installation locations of the fault indicators being on predetermined locations of the power network, with a detection zone formed between two adjacent installation locations of the fault indicators; a fault analyzing step including using a fault analyzing module to generate a plurality of fault points in the detection zones based on fault ratio information of each of the detection zones stored in the database, with the number of the plurality of fault points in each of the detection zones being in proportion to a fault ratio in the detection zone, with locations of the plurality of fault points in each of the detection zones being recorded in one of the installation locations of the fault indicators in the detection zone; a communication quality analyzing step including using a communication analyzing module to measure a communication quality of each of the detection zones to create a communication quality information cumulative probability, and using a random analysis method to calculate a successful communication probability of each of the detection zones; and a successful probability determination step including using the processor to determine whether the successful communication probability in each of the detection zones is larger than a communication standard, and completing determination of the installation locations of the fault indicators in the power network if the successful communication probability in each of the detection zones is larger than the communication standard, or carrying out an installation location updating step if the successful communication probability in any of the detection zones is not larger than the communication standard. The installation location updating step includes using the processor to retrieve the detection zones having a successful communication probability smaller than the communication standard, moving any one of the installation locations of the fault indicators through a unit distance towards a center of the corresponding detection zone having the successful communication probability smaller than the communication standard, and carrying out the fault analyzing step again.

The random analysis method in the communication quality analyzing step can be a Monte Carlo method.

An apparatus for determining installation locations of the fault indicators in a power network according to the present invention includes a database having graphical information of a plurality of feed lines of a power network, communication quality information of each of the plurality of feed lines, and fault rate information of each of the plurality of feed lines. A processor is electrically connected to the database. The processor retrieves the graphical information, the communication quality information, and the fault rate information from the database. A fault analyzing module is electrically connected to the processor. The fault analyzing module generates a plurality of fault points in different zones of the power network based on the fault rate information in the different zones of the power network. A communication analyzing module is electrically connected to the processor. The communication analyzing module measures a communication quality in each of the different zones of the power network and calculates a communication quality information cumulative probability of each of the different zones and then calculates a successful communication probability of each of the different zones based on the communication quality information cumulative probability of each of the different zones.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

The terms "upstream end" and "downstream end" are determined according to the flowing direction of the power along a power line. Namely, when the power flows from a first end to a second end of a power line, the first end is the upstream end, and the second end is the downstream end.

Figure 1:
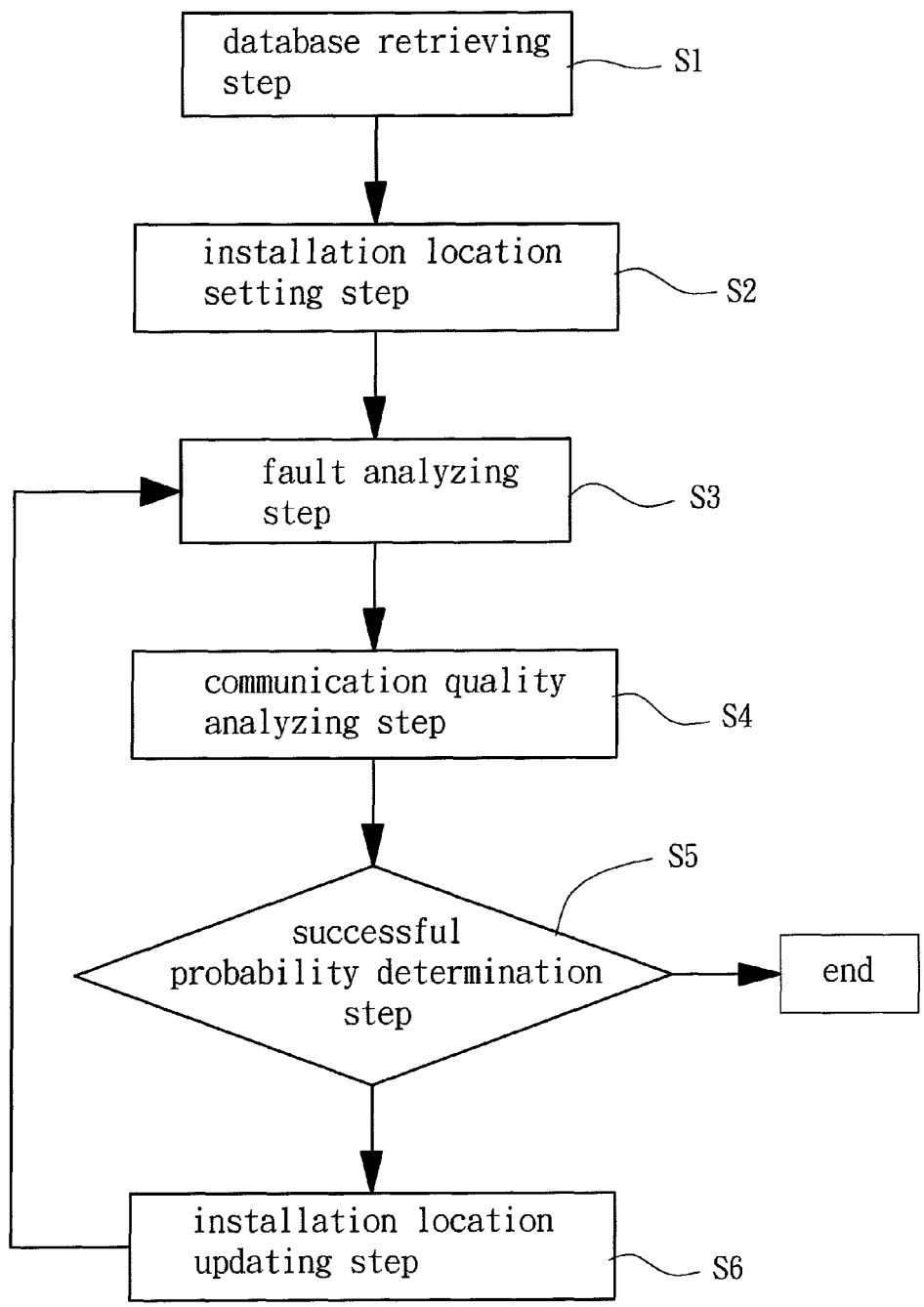
FIG. 1 shows a flowchart of a method for determining installation locations of fault indicators in a power network according to the present invention.

With reference to FIG. 1, a method for determining installation locations of fault indicators in a power network according to the present invention includes a database retrieving step S1, an installation location setting step S2, a fault analyzing step S3, a communication quality analyzing step S4, a successful probability determination step S5, and an installation location updating step S6.

Figure 2:
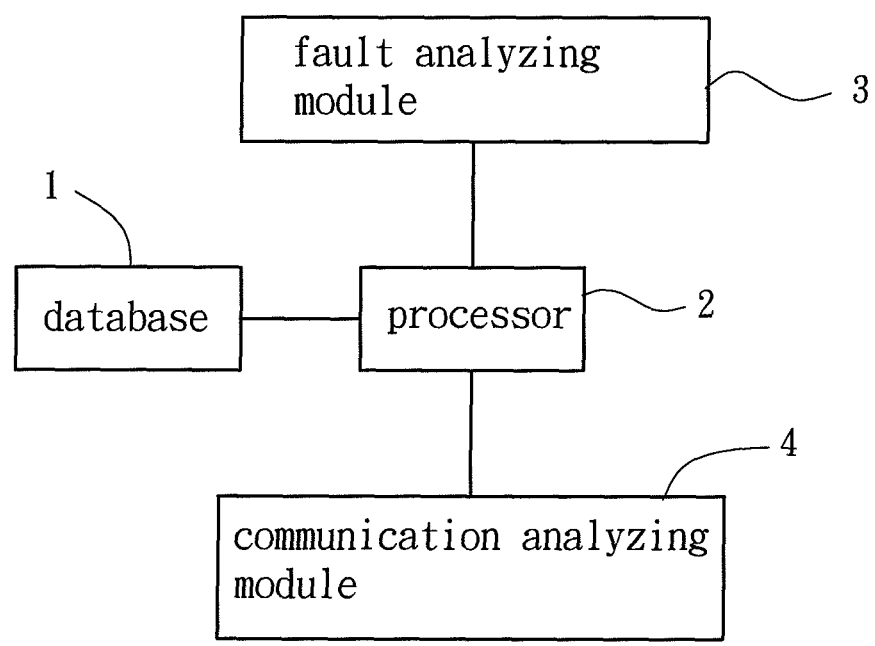
FIG. 2 shows a block diagram of an apparatus for determining installation locations of fault indicators in a power network according to the present invention.

FIG. 2 shows an embodiment of an apparatus for carrying out the method for determining installation locations of fault indicators in a power network according to the present invention. The apparatus includes a database 1, a processor 2, a fault analyzing module 3 and a communication analyzing module 4.

In the database retrieving step S1 of the method for determining installation locations of fault indicators in a power network according to the present invention, the processor 2 is used to retrieve information of a power network 5 from the database 1.

Figure 3:
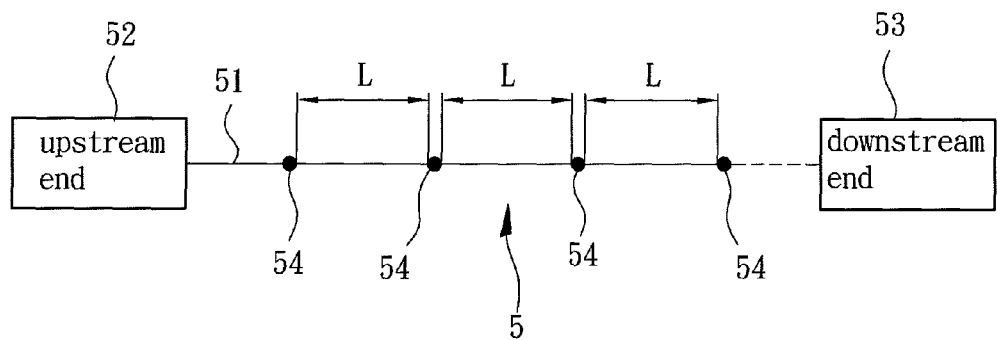
FIG. 3 shows a schematic view illustrating a power distribution system to which the present invention is applied.

With reference to FIG. 3, the power network 5 includes at least one power line 51 each having an upstream end 52 and a downstream end 53 according to the transmission direction of the power. The upstream end 52 can be a substation or a bus, and the downstream end 53 can be a user end. The power network 5 can be converted into graphical information of feed lines represented by coordinates or real scenes for storage in the database 1. When the processor 2 retrieves the graphical information of feed lines of the power network 5, the coordinates or actual distribution of the power network 5 is obtained.

In the installation location setting step S2, the processor 2 sets a predetermined number of installation locations 54 for fault indicators, and the installation locations 54 of fault indicators are on predetermined locations of the power network 5, with a detection zone L formed between two adjacent installation locations 54 of fault indicators.

The predetermined number of installation locations 54 of fault indicators is not limited and can be adjusted according to the total length of the power line 51 of the power network 5. The predetermined number of installation locations 54 of fault indicators can be increased if the power network 5 has a long total length. On the other hand, the predetermined number of installation locations 54 of fault indicators can be decreased if the power network 5 has a short total length.

The installation locations 54 of fault indicators are not limited and can be the predetermined locations established by an outage management system (OMS) of a power company. Alternatively, the installation locations 54 of fault indicators can be selected according to the graphical information of feed lines of the power network 5 and the communication quality of the power line 51 of the power network 5. The installation locations 54 of fault indicators can be set in areas of the power network 5 having better communication qualities. The detection zone L is formed between two adjacent installation locations 54 of fault indicators. The lengths of the detection zones L can be identical to or different from each other.

In the fault analyzing step S3, the fault analyzing module 3 is used to generate a plurality of fault points in the detection zones L based on fault ratio information of each detection zone L stored in the database 1. The number of the fault points in each detection zone L is in proportion to a fault ratio in the detection zone L. The locations of the fault points in each detection zone L are recorded in one of the installation locations 54 of fault indicators in the detection zone L.

Since different detection zones L have different fault rates, to improve the accuracy of fault detection, the historic fault rates of each detection zone L can be stored in the database 1 beforehand. The fault analyzing module 3 can generate the fault points in plural detection zones. The number of the fault points in each detection zone L is based on the fault rate information stored in the database 1. The higher the fault rate in a detection zone, the larger the number of fault points in the detection zone.

In the communication quality analyzing step S4, the communication analyzing module 4 is used to measure a communication quality of each detection zone L to create a communication quality information cumulative probability. A random analysis method is used to calculate a successful communication probability of each detection zone L.

The communication analyzing module 4 calculates the communication quality of transmission of the fault point from each installation location 54 to an adjacent installation location 54 and uses this communication quality as the communication quality of the corresponding detection zone L. The communication quality includes a packet error rate (PER), a link quality indication (LQI), a received signal strength indication (RSSI), etc.

Figure 4:
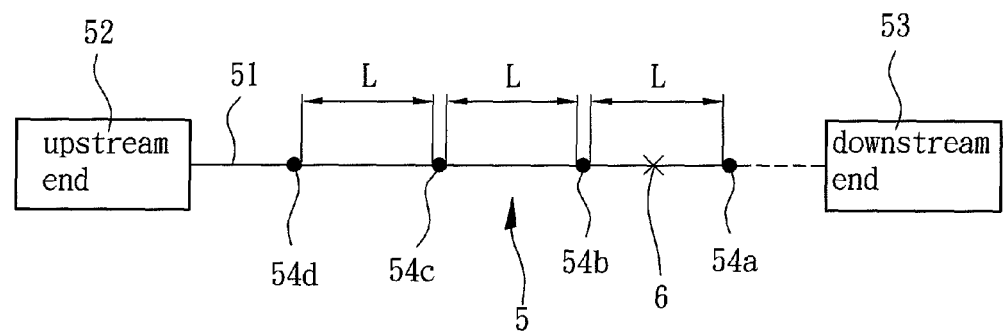
FIG. 4 shows a schematic view illustrating backward transmission of fault information of the power distribution system to which the present invention is applied.

More specifically, the communication analyzing module 4 measures the communication quality in each detection zone L based on the graphical information of the database 1 and creates a distribution of cumulative probability. When the communication analyzing module 4 is proceeding with measurement of the communication quality, the actual terrain of the location of each installation location 54 of fault indicators can be ascertained according to the graphical information of feed lines, increasing the searching speed for finding out the locations of each detection zone L. In a case that a fault point exists in the power network 5, a mechanism for indicating the location of the fault point through backward transmission is provided. In an example shown in FIG. 4 in which the power is transmitted from the upstream end 52 to the downstream end 53, a fault point 6 exists in the detection zone L between two installation locations 54a and 54b of fault indicators. In a case that the fault point 6 is closer to the installation location 54b, the installation location 54b can transmit the location of the fault point 6 to the installation location 54c, the installation location 54d, and then the upstream end 52 of the power network 5 in sequence, completing the backward transmission mechanism of the fault state. The communication analyzing module 4 can use the communication quality information cumulative probability in each detection zone L and uses the random analysis method to calculate the successful communication possibility of backward transmission of the location of the fault point 6 to the upstream end 52. The random analysis method can be a Monte Carlo method.

In the successful probability determination step S5, the processor 2 determines whether the successful communication probability in each detection zone L is larger than a communication standard. Selection of the installation locations 54 of fault indicators in the power network 5 is completed if the successful communication probability in each detection zone L is larger than the communication standard. On the other hand, if the successful communication probability in any of the detection zones L is not larger than the communication standard, the installation location updating step S6 is carried out.

Since the communication quality between any two adjacent installation locations 54 affects the backward transmission mechanism of the location of the fault point in the power network 5, the installation locations 54 of fault indicators are in better locations in the power network 5 if the successful communication probability in each detection zone L is larger than the communication standard, so that the locations of the fault points in different detection zones L can be successfully transmitted back to the upstream end 52, and the method for determining installation locations 54 of fault indicators in a power network according to the present invention is completed. Thus, when the power company is intended to install the fault indicators in the power network 5, the fault indicators can be installed on the installation locations 54 generated by the above method to achieve better transmission while a fault occurs. On the other hand, the installation location updating step S6 is carried out if the successful communication probability in any of the detection zones L is not larger than the communication standard.

In the installation location updating step S6, the processor 2 retrieves the detection zone L having a successful communication probability smaller than the communication standard. Then, the processor 2 moves any one of the installation locations 54 of fault indicators through a unit distance towards a center of the corresponding detection zone L having the successful communication probability smaller than the communication standard, and carries out the fault analyzing step S3 again.

Since low successful communication probability of a detection zone L is caused by overlong distance between two installation locations 54 of fault indicators in the detection zone L or by the terrain, the processor 2 moves any one of the installation locations 54 through a unit distance towards a center of the corresponding detection zone L to shorten the distance between the installation location 54 and an adjacent installation location 54, and the fault analyzing step S3 is carried out again. The unit distance of the installation location 54 is not limited. Namely, the unit distance through which the installation location is moved can range from several meters to several kilometers.

More specifically, after the position of the installation location 54 is changed, the fault analyzing step S3 and the subsequent steps are carried out to obtain the new successful communication probability in each detection zone L. If the new successful communication probability in any detection zone L is still smaller than the communication standard, the installation location updating step S6 is carried out again until the new successful communication in each detection zone L is larger than the communication standard (and the method for determining installation locations of fault indicators in a power network according to the present invention is terminated). When the power company is intended to install the fault indicators in the power network 5, the fault indicators can be located in the installation locations 54 of fault indicators obtained from the above method, achieving better transmission while a fault occurs.

In the apparatus for determining installation locations of fault indicators in a power network according to the present invention, the database 1 is used to store graphical information of feed lines of the power network 5, communication quality information of each feed line, and fault rate information of each feed line. The graphical information of feed lines of the power network 5 can be represented by coordinates or real scenes to show the actual distribution of the power network 5.

The processor 2 is electrically connected to the database 1. The processor 2 retrieves the graphical information, the communication quality information, and the fault rate information from the database 1 to determine the installation locations 54 of fault indicators and to install the fault indicators 54 in the power network 5 for subsequent operation and judgment.

The fault analyzing module 3 is electrically connected to the processor 2. The fault analyzing module 3 generates a plurality of fault points in different zones of the power network 5 based on the fault rate information in different zones of the power network 5.

In this embodiment, after the processor 2 determines the installation locations 54 of fault indicators in the power network 5, the fault analyzing module 3 generate the fault points in the detection zones L based on the fault rates in the detection zones L.

The communication analyzing module 4 is electrically connected to the processor 2. The communication analyzing module 4 measures the communication quality in each of the different zones of the power network 5 and calculates the communication quality information cumulative probability of each of the different zones and then calculates a successful communication probability of each of the different zones based on the communication quality information cumulative probability of each of the different zones.

In this embodiment, after the processor 2 determines the installation locations 54 in the power network 5, the communication analyzing module 4 measures the communication quality in each detection zone L to create distribution of the communication quality information cumulative probability. Then, the random analysis method is used to obtain the successful communication probability of backward transmission of the location of the fault point in each detection zone L to the upstream end 52. The random analysis method can be a Monte Carlo method.

The method and apparatus for determining installation locations of fault indicators in a power network according to the present invention can find out better locations for installing the fault indicators in a power network 5, increasing the transmission rate when a fault occurs.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A method for determining installation locations of a plurality of fault indicators in a power network, with the method comprising:

a database retrieving step including using a processor to retrieve a power network in a database;

an installation location setting step including using the processor to set a predetermined number of installation locations of the fault indicators, with the installation locations of the fault indicators being on predetermined locations of the power network, with a detection zone formed between two adjacent installation locations of the fault indicators;

a fault analyzing step including using a fault analyzing module to generate a plurality of fault points in the detection zones based on fault ratio information of each of the detection zones stored in the database, with a number of the plurality of fault points in each of the detection zones being in proportion to a fault ratio in the detection zone, with locations of the plurality of fault points in each of the detection zones being recorded in one of the installation locations of the fault indicators in the detection zone;

a communication quality analyzing step including using a communication analyzing module to measure a communication quality of each of the detection zones to create a communication quality information cumulative probability, and using a random analysis method to calculate a successful communication probability of each of the detection zones;

a successful probability determination step including using the processor to determine whether the successful communication probability in each of the detection zones is larger than a communication standard, and completing determination of the installation locations of the fault indicators in the power network if the successful communication probability in each of the detection zones is larger than the communication standard, or carrying out an installation location updating step if the successful communication probability in any of the detection zones is not larger than the communication standard, with the installation location updating step including using the processor to retrieve the detection zones having a successful communication probability smaller than the communication standard, moving any one of the installation locations of the fault indicators through a unit distance towards a center of the corresponding detection zone having the successful communication probability smaller than the communication standard, and carrying out the fault analyzing step again.

2. The method for determining installation locations of the fault indicators in a power network as claimed in claim 1, with the random analysis method in the communication quality analyzing step being a Monte Carlo method.

* * * * *